US005682676A

United States Patent [19]

Ikegaya

[11] Patent Number: 5,682,676

[45] Date of Patent: Nov. 4, 1997

[54] METHOD FOR SURFACE TREATMENT OF WORK HAVING PLURAL CYLINDERS WITH DIFFERENT AXIAL ALIGNMENTS

[75] Inventor: Hirohiko Ikegaya, Iwata, Japan

[73] Assignee: Yamaha Hatsudoki Kabushiki Kaisha, Iwata, Japan

[21] Appl. No.: 483,247

[22] Filed: Jun. 7, 1995

[30] Foreign Application Priority Data

Sep. 22, 1994 [JP] Japan .................................... 6-228409

[51] Int. Cl.[6] ................................................ B23P 15/00

[52] U.S. Cl. ................................ 29/888.06; 29/888.061; 29/527.2

[58] Field of Search .............................. 29/888.06, 527.2, 29/888.061, 430; 123/668, 193.2; 205/109, 131; 204/229

[56] References Cited

U.S. PATENT DOCUMENTS 3,300,010 1/1967 Irish .................................... 29/888.06
4,157,607 6/1979 Ernest .................................... 29/888.06
5,148,780 9/1992 Urano et al. .............................. 29/888.06
5,489,422 2/1996 Strobel-Simon et al. ........... 29/888.06

FOREIGN PATENT DOCUMENTS 2523800 9/1983 France .
4201466 7/1993 Germany .
808885 2/1959 United Kingdom .

*Primary Examiner*—Irene Cuda
*Attorney, Agent, or Firm*—Knobbe, Martens, Olson & Bear LLP

[57] ABSTRACT

A method for treating with treating liquid the inside surfaces of cylinders of a work such as a V-shaped engine having cylinders with at least two different axial alignments, characterized in the steps of rotating the work in such a way that each cylinder in another axial alignment is aligned with a longitudinal passage-forming member provided in a workstation; and repeating the same operations on said cylinder at said workstation, thereby allowing for easy operations without interruption.

11 Claims, 14 Drawing Sheets

METHOD FOR SURFACE TREATMENT OF WORK HAVING PLURAL CYLINDERS WITH DIFFERENT AXIAL ALIGNMENTS

BACKGROUND

1. Field of the Invention

This invention relates to a method or apparatus for treating with treating liquid such as plating liquid the inside surface of cylinders of a work provided with at least two cylinders such as engine blocks, and in particular, to such a method or apparatus allowing for treating the inside surface of cylinders having different axial alignments, using a flowing liquid system at a high productivity.

2. Background of the Art

Various technologies for treating the surface of a work, such as plating and degreasing prior to plating, are hitherto known. For example, immersing methods adapted for plating and the like, in which a work is immersed in a treating liquid stored in a tank, are commonly conducted; however, in the methods, treating time is extremely long, and productivity is low. Thus, a method which allows for high speed treatment with an improved efficiency by flowing treating liquid relative to the surface of a work to be treated has been recently developed. Such an apparatus is characterized in plating treatment of the inside circumferential surface of a work having a cylindrical portion by permitting treating liquid to flow over the surface. In the apparatus, a passage-forming cylindrical member is mounted on a work-gripping member of a workstation, in which the passage-forming cylindrical member is being inserted into a cylinder of a cylinder block which is placed on the workstation. By permitting treating liquid to flow between the outside circumferential surface of the passage-forming member and the inside circumferential surface of the cylinder, an intended surface treatment such as plating treatment can be efficiently conducted on the inside wall of the cylinder.

However, in the above apparatus, when the passage-forming member is affixed to the work-gripping member, it is difficult to adapt the above apparatus for cylinders, each having the axial center slanted at a given degree from the axial direction of the cylinder block, such as a cylinder block of a V-shaped engine, since a structure in which each passage-forming member can be placed inside each cylinder without interruption cannot be readily constructed. For this reason, when a work is a cylinder block such as that of a V-shaped engine having circumferential surfaces having at least two different axial alignments, it is difficult or impossible to treat all of the circumferential surfaces without interruption. Further, an apparatus adapted for a work having cylinders with a single axial alignment cannot be readily employed for a work having cylinders with different axial alignments, since the center of balance of the work is not aligned with the axial alignments of the cylinders, thereby making it difficult to secure the work on a workstation.

In addition, in the aforesaid apparatus, the end of the cylinder opposite to the end in which an electrode is inserted is simply closed with a closing member covering the end from the outside. However, in many cases, covering the end from the outside is not sufficient to fully seal the end. In the case of a high speed flowing system, the closing member is especially prone to leaking of treating liquid. Further, when a projecting step such as a crankshaft bearing portion is formed inside the cylinder surface at the end, it is difficult to seal an airtight cover at the end of the cylinder.

SUMMARY OF THE INVENTION

The present invention has exploited a continuous surface-treatment system for a work provided with cylinders having different axial alignments. An objective of the present invention is to provide a continuous surface-treatment system allowing for treating the surfaces of plural cylinders having different axial directions, without interruption, especially by modifying an existing system for a work having cylinders with a single axial alignment, thereby avoiding a costly set-up of a new system. Another objective of the present invention is to provide a sealing system for cylinders to be treated with treating liquid, which allows for secure and efficient sealing of cylinders at an appropriate position, even though an upper crankshaft bearing portion is formed at the edge of the cylinders.

Namely, one important aspect of the present invention is a method for treating with treating liquid the inside surfaces of cylinders of a work such as a V-shaped engine having cylinders with at least two different axial alignments, comprising the steps of: (a) aligning each cylinder of a first alignment with a longitudinal passage-forming member for supplying treating liquid to the inside of said cylinder, provided in a workstation; (b) placing said cylinder on a work-supporting base provided in said workstation to sheathe the length oh said longitudinal passage-forming member with said cylinder; (c) supplying treating liquid to the inside of said cylinder via the passage formed inside said cylinder by said longitudinal passage-forming member, thereby treating said inside surface of said cylinder with said treating liquid; (d) detaching said work from said workstation; (e) rotating said work in such a way that each cylinder in another axial alignment is aligned with a longitudinal passage-forming member provided in a workstation; and (f) repeating the same operations on said cylinder at said workstation. The passage-forming member is preferably disposed vertically. By rotating the work, after treating each cylinder of the first alignment, in such a way that each cylinder of another alignment is aligned with a workstation which can be the same or different than the first workstation, surface treatment of a work having cylinders with different axial alignments can be easily conducted without interruption. Further, according to the above method, an existing system for treating a work having cylinders with a single alignment can be used with little modification.

In the above method, when plural workstations for preliminary treatments and plating treatment are consecutively placed, the work is transferred from one to another, and the above operations are conducted at each workstation. The workstations for treating each cylinder of the first axial alignment and the workstations for treating each cylinder of another axial alignment are preferably aligned in parallel.

In addition, in the above method, when the end of each cylinder opposite to the entrance of the longitudinal passage-forming member is sealed with a sealing jig between steps (b) and (c), various treatments can be conducted in a line; for example, at a workstation for washing, washing can be conducted by spraying water from said end while it is securely sealed with the sealing jig at a workstation for plating.

The sealing jig preferably comprises: a rod having a pressing plate at the end facing said longitudinal passage-forming member; a rod-accommodating member inside which said rod moves in the axial direction; and a sealing member for sealing the end of said cylinder, which is provided at the end of said rod-accommodating member in such a way that said sealing member seals the end of said cylinder by extending in the outward direction, when said rod moves relative to said rod-accommodating member to press said sealing member with said pressing plate in the axial direction. By using the above sealing jig, it is possible to duly treat the inside surface of a cylinder even though a projecting step such as a crankshaft bearing portion is formed at the end of the cylinder, since the sealing member which can extend in place in the outward direction can be easily passed through the end of the cylinder when not extending. In particular, when the sealing member extends in the outward direction while the rod-accommodating member moves towards the longitudinal passage-forming member, it is possible to place the sealing member close to the passage-forming member, thereby diminishing the dead area which is between the lower dead point position of a piston and the very edge of the cylinder. The dead area is necessary for secure sealing, but need not be plated, and consequently enlarges the size of the cylinder if simply the rod, not the rod-accommodating member, moves to press the sealing member so that the sealing member extends to seal the end of the cylinder, the stroke of the rod in the axial direction is great, thereby parting from the passage-forming member, i.e., resulting in a wide dead area. When each of the extension of the sealing member and the move of the longitudinal passage-forming member takes place alternately at least once, it is possible to easily position the sealing member near the passage-forming member.

In connection with the above sealing mechanism, the longitudinal passage-forming member, which functions as an electrode, preferably comprises: an inner cylinder, the inside of which forms a passage for the treating liquid; an outer cylinder made of a mesh material; and metal pellets to be electrolyzed accommodated between said inner and outer cylinders; and said pressing plate is provided with a cover for said outer cylinder, made of a mesh material, on the surface facing said longitudinal passage-forming member so as to prevent said metal pellets from flowing out of said outer cylinder. In the above structure, the sealing member can also function as a cover to the electrode.

The other important aspect of the present invention is an apparatus which realizes the aforesaid method, comprising: (a) at least one workstation wherein the inside surface of each cylinder of a first alignment of said work is treated with treating liquid, comprising: (i) a longitudinal passage-forming member provided in said workstation for forming a passage inside the cylinder; (ii) a supplying passage for supplying treating liquid to said passage formed by said longitudinal passage-forming member; and (iii) a discharge passage for discharging the treating liquid from said passage formed by said longitudinal passage-forming member; (b) a gripping mechanism for holding said work in place where each cylinder of one axial alignment of said work is aligned with said passage-forming member; (c) a moving mechanism for moving said work in the axial direction of said longitudinal passage-forming member to place said work onto and detach said work from said workstation, said moving mechanism being connected to said gripping mechanism; and (d) a rotating mechanism for rotating said work so that each cylinder of another axial alignment is aligned with said passage-forming member or another passage-forming member provided in another workstation, in combination with said vertically moving mechanism and said gripping mechanism. The details of the apparatus will be described later.

DETAILED DESCRIPTION OF THE PREFERRED EMBODIMENTS

Figure 1:
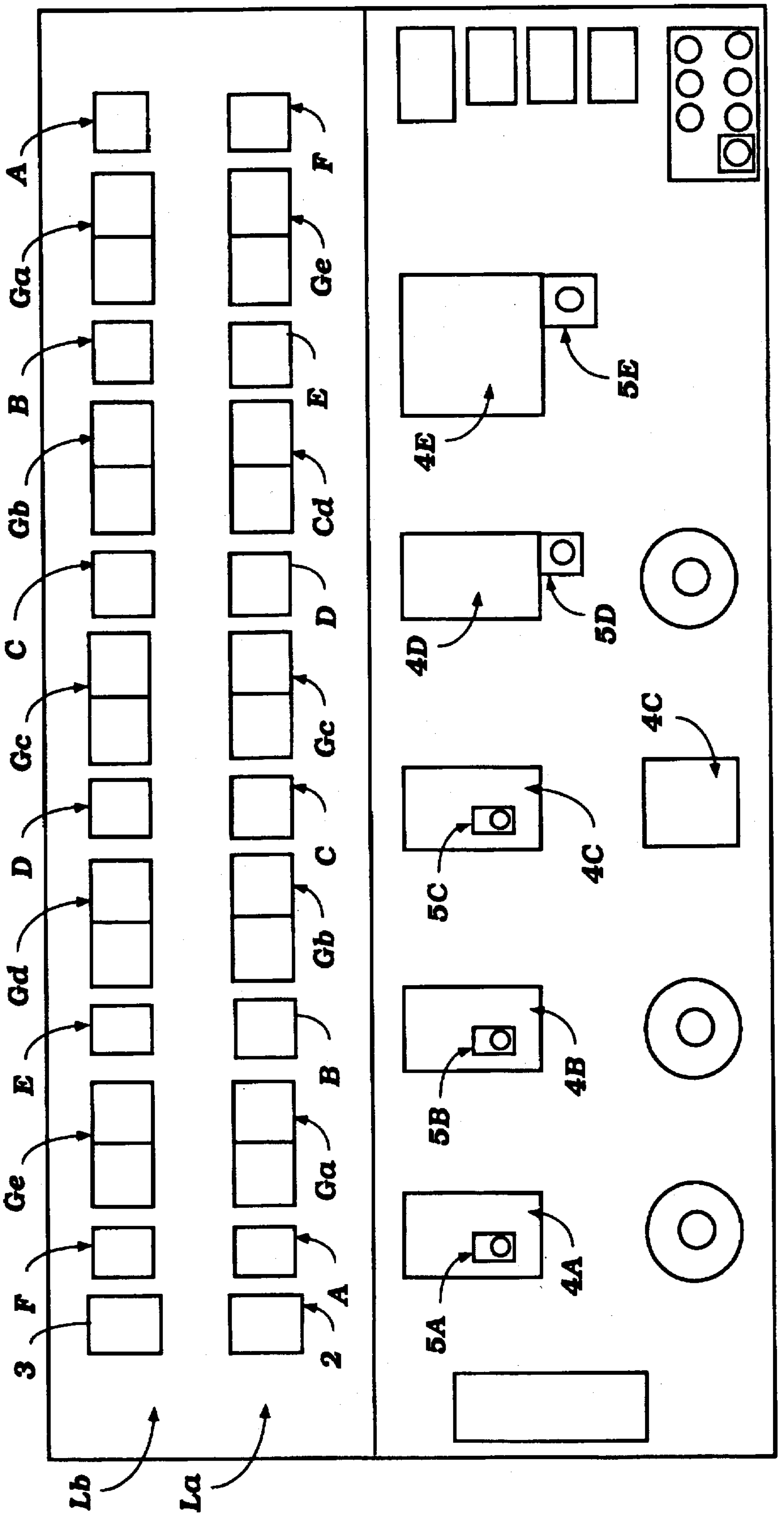
FIG. 1 is a schematic plane view illustrating one embodiment of a plating system of the present invention adapted to plate the inside surface of a cylinder block having cylinders with different axial alignments, said system comprising degreasing treatment, alkali etching, mixed acid etching, alumite-forming treatment, and plating treatment.

Work Having Cylinders With Different Axial Alignments

In the present invention, a work having cylinders with at least two axial alignments can be treated at a high level of productivity. Various works can be treated based on the present invention without restriction, as long as the works have circumferential inside surfaces to be treated, which are arranged so as to have at least two axial alignments. No restriction should be applied to the number of axial alignments, the directions of the axial alignments, the number of cylinders, the size of cylinders, the type of surface treatment and the like. In practice, a cylinder block of a V-shaped engine typifies such a work, which has cylinders aligned in two axial directions. The inside surfaces of the cylinders made of an aluminum alloy, for example, upon which a piston reciprocally slides need to be plated with a plating coating. Such a V-shaped internal combustion engine can be designed for any purpose, such as automobile engines, motorcycle engines and lawn mower engines, regardless of whether they are two-cycle or four-cycle engines.

Surface Treatments

Any surface treatment which can be systematically or continuously conducted can be employed in the present invention. In practice, plating treatment typifies such a treatment. In a plating treatment, preliminary treatments such as a degreasing treatment, alkali etching treatment, mixed acid etching treatment, and alumite-forming treatment are preferably included. For example, in the first process, a cylinder, the inside surface of which has been machined, is subjected to degreasing to degrease the surface. In the second process, the surface is subjected to alkali etching using a flowing etching solution which dissolves a small amount of aluminum base material on the surface. In the third process, mixed acid etching is implemented on the surface using a flowing etching solution which further dissolves the Si, for example, on the surface. Plating liquid is in a flowing state with respect to the inside surface, and in the fourth process, a porous alumite layer is formed on the surface. In a fifth process, a Ni—SiC or Ni—P—SiC plating layer is formed on the surface of the alumite layer.

In the above, each process can be conducted at a different workstation which is placed in sequence, constituting a surface treatment system in which treating liquid flows. Although all of the above processes need not be conducted at such a workstation, at least in a plating process, a flowing system is preferably used since plating is critical to overall productivity and the quality of a plating coating. A flowing system is preferably conducted by inserting a passage-forming member into the circumferential inside surface of a cylinder in which treating liquid flows between the inside surface of the cylinder and the surface of the passage-forming member. When both the preliminary processes and the plating process are conducted with a flowing liquid system, the number of process steps can be lowered, thereby making the plating operations easier, in addition to obtaining good uniformity of Ni—P—SiC coating and good adhesion strength thereof.

Plating Process For Cylinders

One of the important surface treatments is plating treatment. As a plating process, a process which allows for formation of a plating coating containing a dispersoid substance such as ceramics, e.g., silicon carbide and alumina, is preferably adapted to a workstation. For example, a high speed plating method, i.e., a flowing liquid plating system or a circulation plating system, is preferably employed. In the method, a plating liquid such as a nickel sulfamate bath or a nickel sulfate bath which optionally contains phosphorus of 0.1–0.3 g/l is permitted to flow on the surface of a cylinder at a plating liquid flow rate of 1.0 to 7.0 meters per second (preferably 2.0 to 6.0 meters per second) while impressing a voltage between an electrode and the surface at an electric current density of 20 to 400 $A/dm^2$ (preferably 50 to 300 $A/dm^2$). During plating, the flow rate and the electric current density can be changed continuously or at intervals so as to change the distribution of a dispersoid substance in the plating coating.

In addition, the electrode is preferably made of material such as nickel with which the inside surface of the cylinder is plated by electrolyzing the material, so that plating can be efficiently conducted.

Other Processes

An alumite-forming process is another important process, and an anodized aluminum film (i.e., alumite) can be formed under the plating coating in order to improve frictional properties and adhesion strength between the plating coating and the surface of the cylinder material, by using a flowing plating liquid method. The alumite has a porous and durable structure, and thus a plating coating can be firmly deposited on the cylinder surface. The thickness of the alumite is in the approximate range of from 1 to 2 μm.

Between each surface treatment, washing needs to be conducted to wash off the chemical residues from the inside surface of the cylinder by, for example, spraying water.

Workstations In Sequence

A workstation for treating each cylinder with one axial alignment typically comprises: (i) a longitudinal passage-forming member provided in said workstation for forming a passage inside the cylinder; (ii) a supplying passage for supplying treating liquid to said passage formed by said longitudinal passage-forming member; and (iii) a discharging passage for discharging the treating liquid from said passage formed by said longitudinal passage-forming member.

In order to conduct treatment(s) at a high productivity, the following mechanisms should be installed: (1) a gripping mechanism for holding said work in place where each cylinder of one axial alignment of said work is aligned with said passage-forming member; and (2) a moving mechanism for moving said work in the axial direction of said longitudinal passage-forming member to place said work onto and detach said work from said workstation, said moving mechanism being connected to said gripping mechanism.

When plural workstations, i.e., plural surface treatments, are connected in sequence to construct an entire apparatus, a transferring mechanism for transferring said work from one workstation to another workstation should be installed.

Each longitudinal passage-forming members is preferably placed in such a way that the axial direction thereof is vertical, thereby easing operations. Further, when the longitudinal passage-forming member functions as an electrode, it preferably comprises: (i) an inner cylinder, the inside of which forms a passage for the treating liquid; (ii) an outer cylinder made of a mesh material; and (iii) metal pellets to be electrolyzed accommodated between said inner and outer cylinders; and (vi) said pressing plate is provided with a cover for said outer cylinder, made of a mesh material, on the surface facing said longitudinal passage-forming member so as to prevent said metal pellets from flowing out of said outer cylinder. The above cover can be affixed to a sealing jig (described later), thereby efficiently performing plating treatment.

Rotating System For Cylinders Having Different Axial Alignments

In the present invention, a work having cylinders with at least two axial alignments can be efficiently treated without interruption. That was not hitherto achieved. That is, in the present invention, a rotating mechanism for rotating said work is installed so that each cylinder in another axial alignment is aligned with said passage-forming member or another passage-forming member provided in another workstation, in combination with said moving mechanism and said gripping mechanism. The rotating mechanism is preferably built in with the gripping mechanisms which is incorporated in the moving mechanism. In particular, when apparatus is composed of plural workstations, the above rotating mechanism is startlingly effective in treating cylinders with different axial alignments, without interruption. In addition, according to the above embodiment, existing workstations can be used as is, thereby avoiding a costly new system.

In the case of a cylinder block of a V-shaped engine, there are two axial alignments, and thus, two treatment lines are basically required, each used for cylinders with a different axial alignment. For example, the workstations for treating each cylinder of one axial alignment, which are placed in line, and the workstations for treating each cylinder of another axial alignment, which are placed in line, can be aligned in parallel. In this case, a work goes back and forth (a back-and-forth motion), or in effect does a U-turn (a U-turn motion), depending on whether the work turns half circle or not at the end of the first treatment line, although the former is preferable in view of efficiency. In any case, the sequence of the workstations in the second treatment line is the reversed order. The rotating mechanism which is built into the gripping mechanism incorporated in the moving mechanism is preferably operated, while the gripping mechanism is gripping the work, at the end of the first line, and rotating the work to fit it into the second line. A rotation of 90° makes the cylinders with the second axial alignment positioned at the same position as that of the cylinders with the first axial alignment in the case of a cylinder block of a V-shaped engine, since the difference in axial alignment is 90°. Before rotating the work, the work must be moved up, and detaches from the first line using the moving mechanism. The moving mechanism can slide on a beam to the second line.

In the above, the first line and the second line need not be in parallel. For example, these lines can be in line so that simply by rotating the work, it is possible to position the cylinders in the second row at the second line with little movement.

Sealing Mechanism At Workstation

According to the desired embodiment, treatment liquid flows inside each cylinder to be treated. Although the passage for the treating liquid is formed by the passage-forming member, if the end of each cylinder opposite to the entrance of the longitudinal passage-forming member is sealed with a sealing jig after placing the work onto a workstation and before permitting the treating liquid to flow, various treatment can be conducted in the line; for example, at a workstation for washing, washing can be conducted by spraying water from said end while it is securely sealed with the sealing jig at a workstation for plating. Thus, a sealing mechanism, which has a sealing jig for sealing the end of said cylinder opposite to the entrance of said longitudinal passage-forming member, is preferably installed. The sealing mechanism is aligned with each workstation so that the work at each workstation is sandwiched by said sealing mechanism and said workstation.

A sealing jig preferably comprises: (1) a rod having a pressing plate at the end facing said longitudinal passage-forming member; (2) a rod-accommodating member inside which said rod moves in the axial direction; and (3) a sealing member for sealing the end of said cylinder, which is provided at the end of said rod-accommodating member in such a way that said sealing member seals the end of said cylinder by extending in the outward direction, when said rod moves relative to said rod-accommodating member to press said sealing member with said pressing plate in the axial direction. By installing a moving mechanism for moving the sealing mechanism up and down in the axial direction of the passage-forming member to fit the sealing jig into and detach the sealing jig from the cylinder at the workstation, it makes it easy to position the sealing jig at the end of the cylinder opposite to the entrance of the passage-forming member. In particular, the moving mechanism preferably comprises three mechanisms, each being operable independently: (i) a rod-moving mechanism for moving said rod up and down in the axial direction; (ii) a rod-accommodating member-moving mechanism for moving said rod-accommodating member up and down in the axial direction; and (iii) a sealing jig-moving mechanism for moving said sealing jig up and down in the axial direction. By using plural moving mechanisms, each being operable independently, it is possible to easily position the sealing member near the edge of the passage-forming member, thereby diminishing the dead area which is between the lower dead point position of a piston and the very edge of the cylinder. The dead area is necessary for secure sealing, but need not be plated, and consequently enlarges a size of the cylinder. If simply the rod, not the rod-accommodating member, moves to press the sealing member so that the sealing member extends to seal the end of the cylinder, the stroke of the rod in the axial direction is great, thereby parting from the passage-forming member, i.e., resulting in a wide dead area. When each of the extension of the sealing member and the move of the longitudinal passage-forming member takes place alternately at least once, it is possible to easily set the sealing member near the passage-forming member. In addition, according to the above embodiment, sealing can be achieved irrespective of the presence of a projecting step such as an upper crankshaft bearing portion at the end of the cylinder.

In order to efficiently control the above sealing operations, a controller for controlling the timing of the moves of said rod and said rod-accommodating member is preferably installed so that said sealing member extends in the outward direction while said rod-accommodating member moves towards said longitudinal passage-forming member. If the sealing rod and the rod-accommodating member move alternately, and approach the passage-forming member in steps, without fully touching the inside surface of the cylinder, it is possible to readily position the sealing member near the passage-forming member. However, if the above controller allows for synchronously controlling the aforesaid moving mechanisms, the sealing member can be positioned near the passage-forming member at a time.

EXAMPLE 1

Treatment Of Cylinder Block Of V-Shaped Engine

Surface Treatment Apparatus

Figure 2:
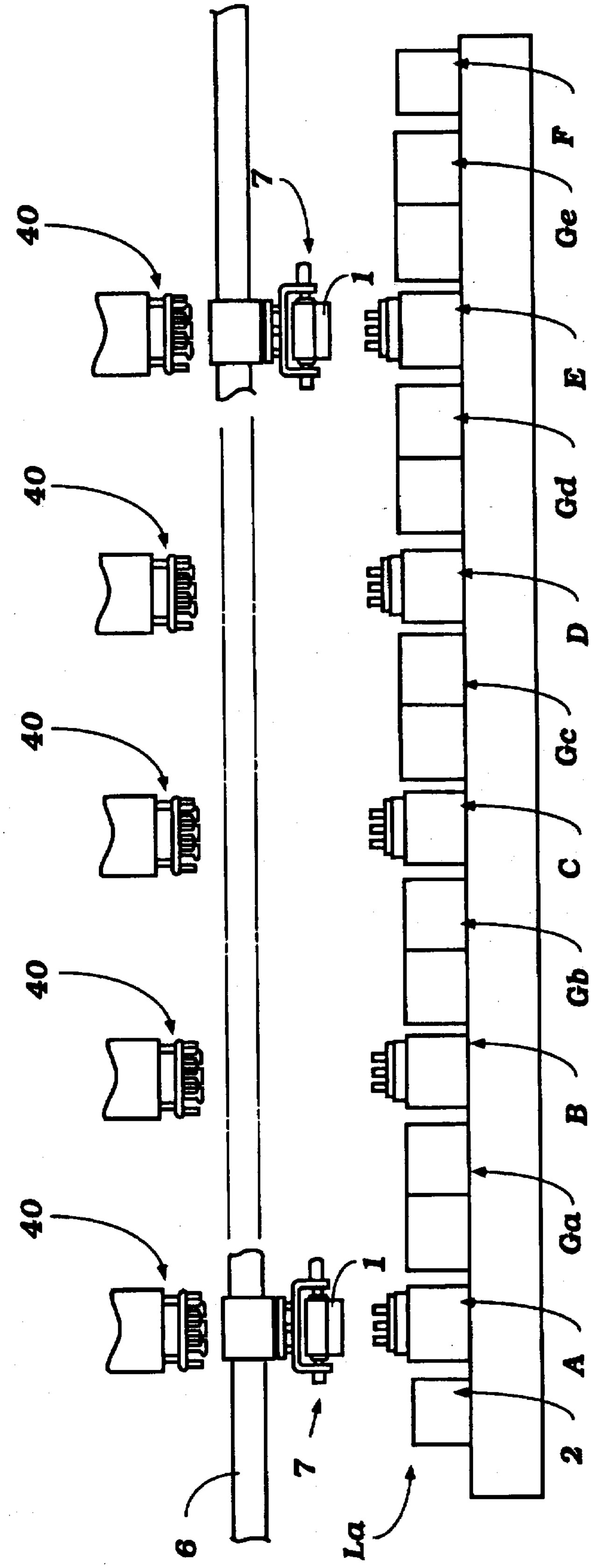
FIG. 2 is a schematic front view illustrating one embodiment of a plating system of the present invention adapted to plate the inside surface of a cylinder block having cylinders with different axial alignments, said system comprising degreasing treatment, alkali etching, mixed acid etching, alumite-forming treatment, and plating treatment.
Figure 3:
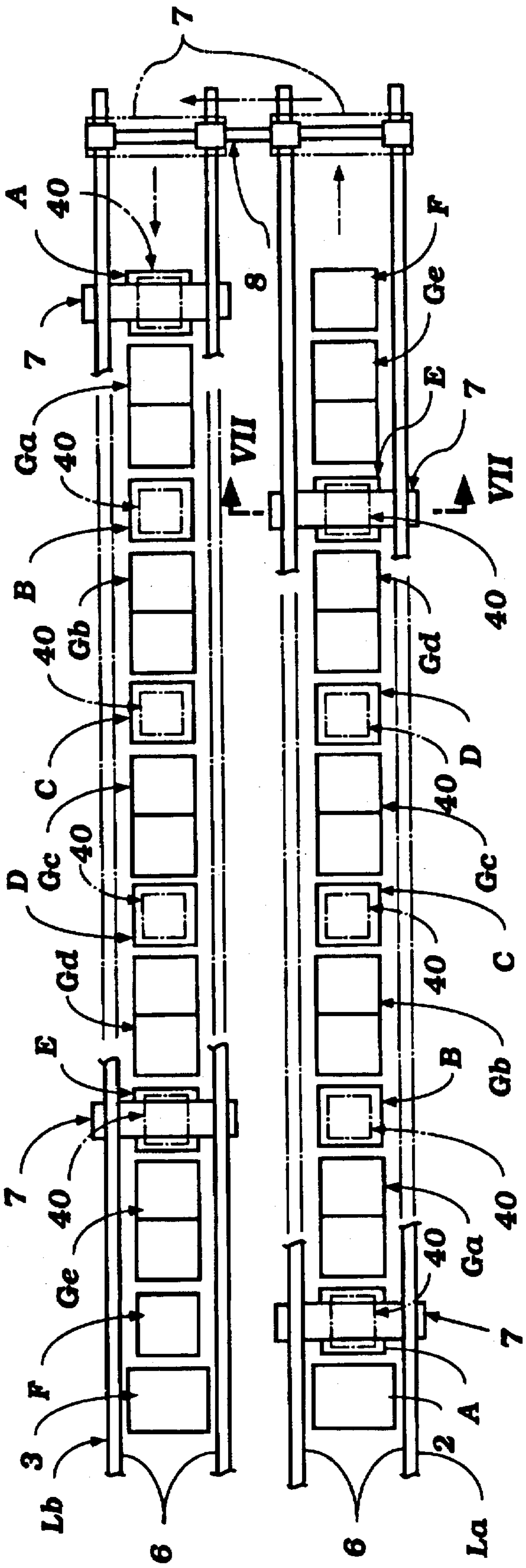
FIG. 3 is a schematic plane view illustrating one embodiment showing the positional relation between a work-transferring mechanism and the workstations in a plating system, said system comprising degreasing treatment, alkali etching, mixed acid etching, alumite-forming treatment, and plating treatment.

FIGS. 1–3 are schematic diagrams showing one embodiment of a plating treatment system of the present invention. The work is a cylinder block 1 of a V-shape engine. In the plating treatment system of the present invention, the plating is applied to the inner periphery of the cylindrical part of the cylinder block 1. The type of plating is not necessarily limited by the present invention. For example, the present invention employs the compound plating having nickel which includes silicon carbide and phosphorus as dispersant.

The plating treatment system includes a treatment line La (first line) and treatment line Lb (second line). The first treatment line La is comprised of prior treatment ports A–D, plating treatment port E and dryer port F which are arranged in operational order. Similarly, the second treatment line Lb is comprised of the prior treatment ports A–D, plating treatment port E and dryer port F. However, the first and second treatment lines La and Lb are arranged in opposite directions (left and right in FIG. 1) from each other. More specifically, the first and second treatment lines La and Lb are respectively comprised of: a degreasing treatment port A, alkali etching treatment port B, mixed acid treatment port C, alumite treatment port D, high-speed plating treatment port E and dryer port F. Further, in the first and second treatment lines La and Lb, washing ports Ga, Gb, Gc, Gd and Ge are respectively provided between the treatment ports A–E, high-speed plating treatment port E and dryer port F.

In this system, the cylinder block 1 is moved from left to right in the treatment line La. The cylinder block 1 is then transferred to the treatment line Lb and further moved from right to left so that each treatment is performed thereon. A work positioning port 2 is provided at the starting end (left side in FIG. 1) of the treatment line La. Similarly, a work transferring port 3 is provided at the terminal end (left side in FIG. 1) of the treatment line Lb.

Behind the treatment lines La and Lb, there is a degreasing solution storage tank 4A, alkali solution storage tank 4B, mixed acid storage tank 4C and its mixed acid drainage tank 4C', alumite solution storage tank 4D and plating solution storage tank 4E. Between these tanks 4A–4E and corresponding treatment ports A–E, pumps 5A, 5B, 5C, 5D and 5E are provided. Although they are not shown in FIGS. 1–3, pipes for supplying and draining the treatment solutions are provided therebetween.

Further, work transfer equipment is respectively provided above the treatment lines La and Lb. The work transfer equipment is comprised of: a pair of parallel beams 6 which are provided at a certain height; multiple work transfer devices 7 (holding mechanism) provided across the beams 6 which are movable along the beams 6; a transfer mechanism 8 which transfers the work transfer device 7 from the treatment line LA to the treatment line Lb.

Figure 4:
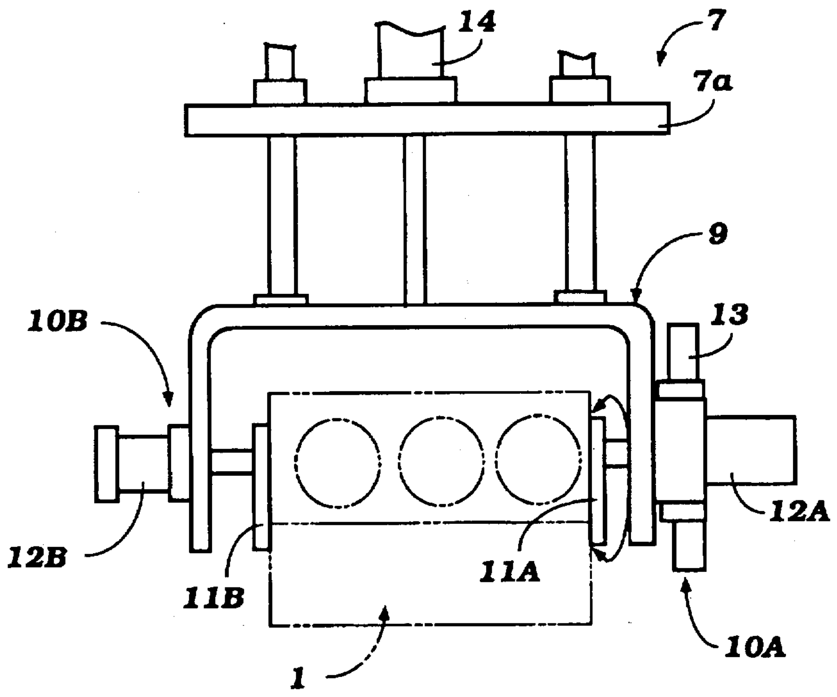
FIG. 4 is a schematic front view illustrating one embodiment of a work-gripping mechanism and a work-rotating mechanism installed under a work-transferring mechanism, in which the two-dash line indicates a V-shaped cylinder block in place (the upside is the crankshaft side).
Figure 5:
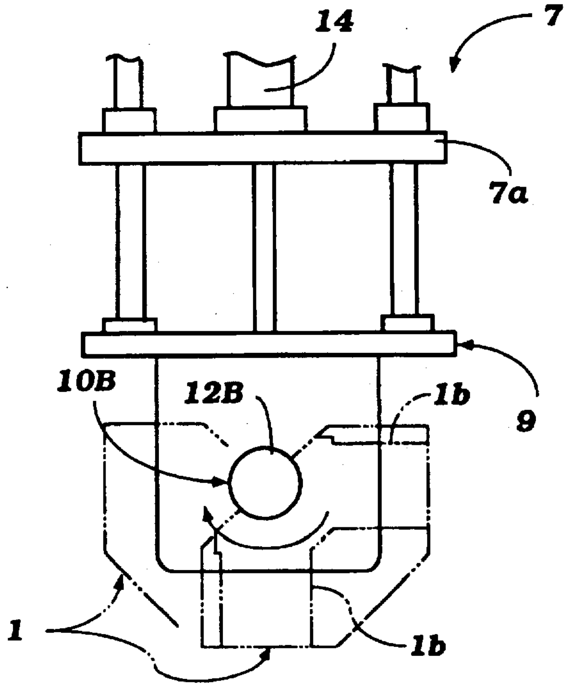
FIG. 5 is a schematic side view, from the direction indicated by arrow A in FIG. 4, of the work-gripping mechanism and work-rotating mechanism installed under the work-transferring mechanism of FIG. 4. One-dash line indicates the V-shaped cylinder block rotated at 90°.

FIGS. 4 and 5 show the specific structure of the work transfer device 7.

The work transfer device 7 is movable along the beams 6. The work transfer device 7 is further comprised of: a supporting part *7a* connected to the body of the work transfer device 7, a frame 9 supported by the supporting part *7a* which is movable in the upper/lower directions; and a pair of chuck mechanisms 10A and 10B provided in the frame 9.

The chuck mechanisms 10A and 10B are comprised of: work chucks 11A and 11B projected inwardly from both sides of the frame 9 which are movable in the forward/backward directions; and, air cylinders 12A and 12B for driving the work chucks 11A and 11B respectively, wherein the cylinder block 1 can be clamped by the work chucks 11A and 11B due to the driving force of the air cylinders 12A and 12B. The chuck mechanisms 10A and 10B are mounted rotatably on the frame 9. The chuck mechanisms 10A and 10B are rotated by the operation of the air cylinder 13 through a rack and pinion (not shown) so that the clamped cylinder block 1 is rotated to a predetermined angle. The frame 9 is moved up/down by an air cylinder 14.

In the work transfer equipment, the transfer mechanism 8 is provided between the terminal end of the treatment line La and the starting end of the treatment line Lb. Although it is not illustrated in detail in the drawing, the transfer mechanism 8 transfers the work transfer device 7 from the treatment line La to the treatment line Lb by moving a part of the beam 6 of the treatment line La with the work transfer device 7 placed on this part of the beam 6 to the treatment line Lb, as briefly illustrated in chain lines in FIG. 3.

Furthermore, auxiliary members 40, which will be described in details later, are provided between the beams 6 and above the treatment lines La and Lb. The auxiliary members 40 are provided in corresponding positions to each treatment port A–E, wherein the auxiliary members 40 are arranged to move up/down over each treatment port A–E. When the surface treatment is performed at each treatment port A–E, the auxiliary members 40 are respectively moved straight down to a point above each treatment port A–E through a space between the beams 6 so as to fit into the cylinder blocks 1 supported at each treatment port.

Figure 6:
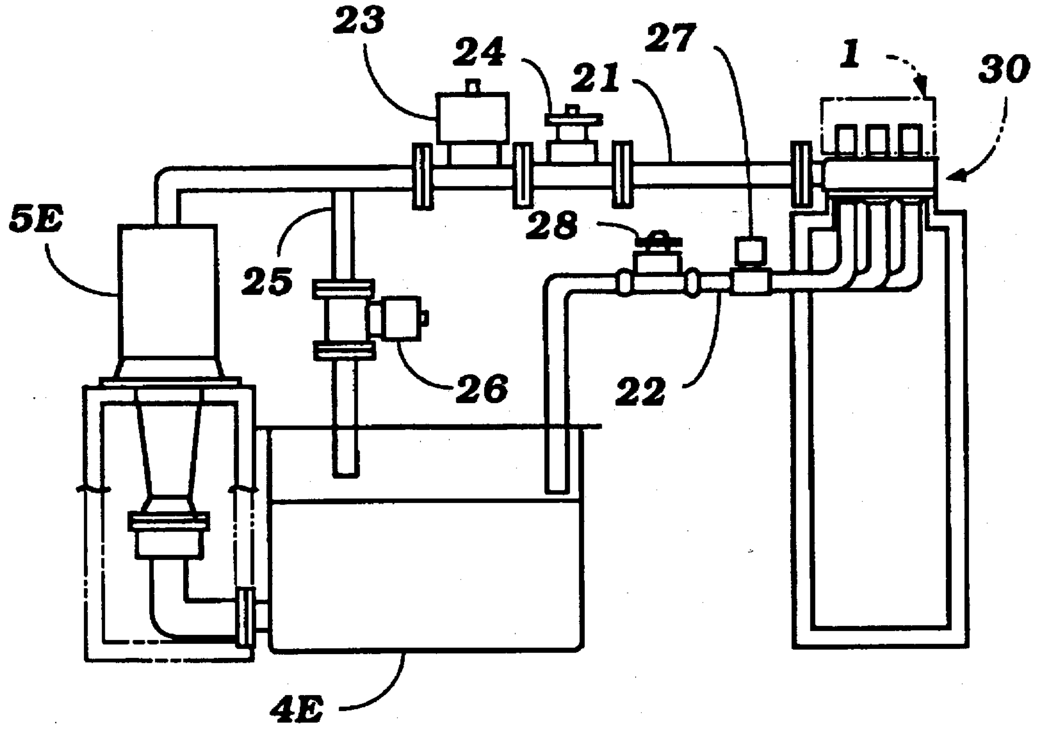
FIG. 6 is a schematic view illustrating a piping system of a plating system adapted to plate the inside surface of the cylinder block.

FIG. 6 is a diagram showing a supply/collection system for the plating solution in the plating treatment port E for the high-speed plating process. In FIG. 6, a plating solution supply pipe 21 and plating solution collection pipe 22 are provided between the storage tank 4E, pump 5E connected to the storage tank 4E and a workstation 30 having the work support port. The upstream end of the supply pipe 21 is connected to the pump 5E. The downstream end of the supply pipe 21 is connected to a plating solution guide-in passage 33 (which will be described in detail later) of the workstation 30. The upstream end of the plating solution collection pipe 22 is connected to a guide-out passage 39 (which will also be described in detail) of the workstation 30. The downstream end of the plating solution collection pipe 22 is connected to the storage tank 4E.

In the plating solution supply pipe 21, a main automatic valve 23 and main manual valve 24 are provided so as to adjust the supplying amount of the plating solution. Further, a bypass passage 25 branches from the supply pipe 21 upstream of the valves 23 and 24 so as to return excess solution to the tank 4E. An automatic bypass valve 26 is provided in the bypass passage 25. A flow volume sensor 27 and flow passage adjusting valve 28 are provided in the collection pipe 22 so as to adjust the amount of the recovered solution.

Plating Workstation

Figure 7:
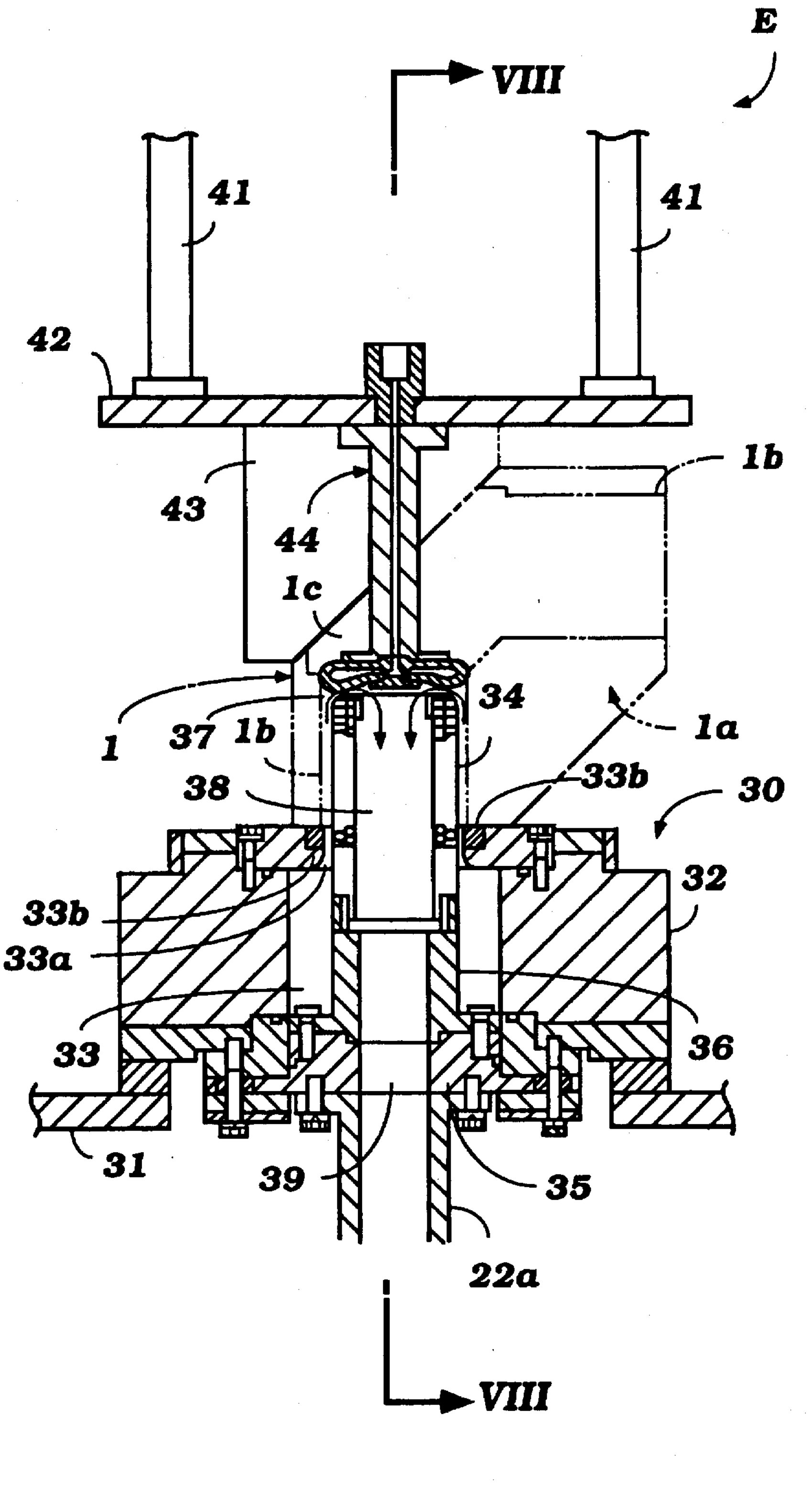
FIG. 7 is a schematic vertical cross-sectional view perpendicular to a crankshaft (not shown) illustrating one embodiment of a workstation for plating treatment, in which a sealing mechanism has descended to fit into a cylinder (two-dash line). A work-gripping mechanism is not shown.
Figure 8:
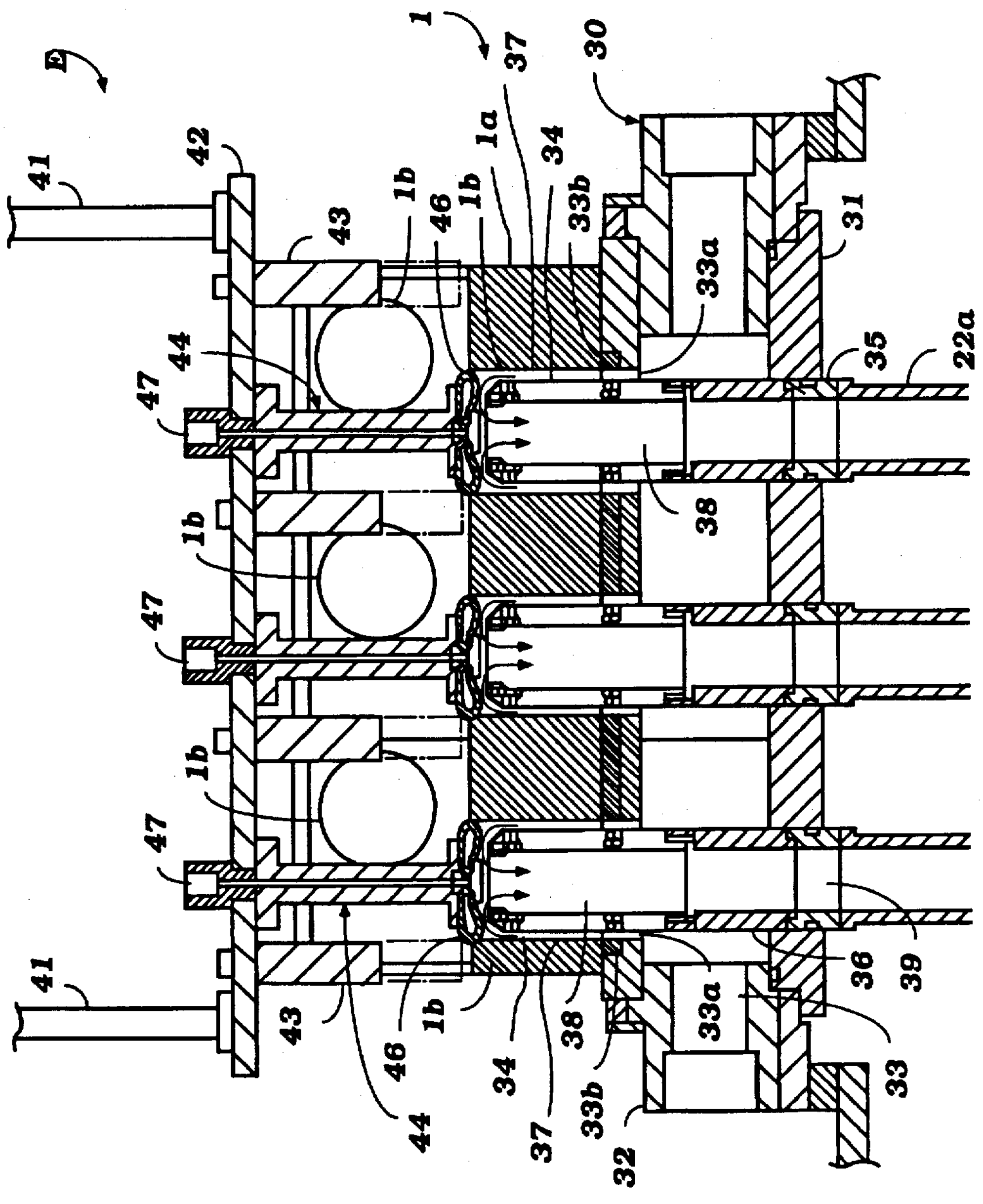
FIG. 8 is a schematic vertical cross-sectional view parallel to a crankshaft (not shown) illustrating the workstation cut in the direction marked VIII in FIG. 7.

FIGS. 7 and 8 show a detailed structure of the plating treatment port E. In FIGS. 7 and 8, a support block 32 as a work support port is provided on a base 31 of the plating workstation 30. The cylinder block 1 is supported on the support block 32. The cylinder openings 1 b are blocked by the support block 32. In particular, the cylinder block 1 of the V-shaped engine is comprised of a cylinder arrangement part 1 a having multiple (six cylinders in the drawing) cylinders *1b* aligned at a certain angle alternatively (90°) and crank case *1c*. The cylinder block 1 is supported by the support block 32, wherein the cylinder block 1 is in an upside-down position compared with the mounting position in a vehicle, and the openings of one row of the cylinders *1b* aligned in the "V" shape are vertically disposed. The lower openings (openings of the head side) of each cylinder *1b* are blocked by the support block 32.

The plating solution guide-in passage 33 is provided in the support block 32 at the lower part of the cylinder arrangement 1 a of the cylinder block, wherein the guide-in passage 33 extends in the transverse direction (the direction in which cylinders are aligned). Both ends of the guide-in passage 33 are connected to the plating solution supply pipe 21. On the upper surface of the support block 32, openings *33a* connecting to the passage 33 are provided in corresponding positions to each cylinder *1b* of the cylinder block 1. In addition, sealing portions 33*b* are provided around the openings 33*a*. As described in the foregoing, when the cylinder block 1 is supported on the support block 32, the lower cylinder openings 1*b* of the cylinder block 1 and the openings 33*a* are mated. Further, the lower end surface (end surface of the head side) of the cylinder block 1 and the upper surface of the support block 32 are sealed by the sealing portions 33*b*.

Furthermore, electrodes 34 functioning as flow passage members are positioned on the workstation 30, corresponding to each cylinder 1*b* of the cylinder block 1 which is supported by the support block 32. The electrodes 34 are cylindrical. The electrodes 34 are mounted on holders 35 mounted on the base 31 through cylindrical mounting members 36, wherein the electrodes 34 are projected upward from the openings 33*a* through the guide-in passage 33. The electrodes 34 are respectively inserted into the cylinders 1*b* while the cylinder block 1 is supported by the support block 32 as described in the foregoing. The upper ends of the electrodes 34 reach in the vicinity of the upper ends of the cylinders 1*b* while maintaining a certain gap between the outer periphery of each electrode and inner periphery of each cylinder. Thus, inside the cylinders 1*b* of the cylinder block 1, outer passages 37 are provided at outside of the electrodes 34. Similarly, inner passages 38 are provided at inside of the electrodes 34. The passages 38 and 39 meet at the top of the cylinder 1*b*. Further, the outer passages 37 are connected to the guide-in passage 33.

Furthermore, through-holes are provided in the holder 35, wherein the through-holes and inner space of the mounting members 36 form the guide-out passage 39 connecting to the inner passage 38 of the electrodes 34. The guide-out passage 39 is connected to each collection pipe 22 through connecting pipes 22*a*. The mounting members 36, holder 35 and connecting pipes 22*a* are made of conductive materials and electrically connected to a rectifier.

The auxiliary member 40 is connected to operational shaft 41 operated by the air cylinder (not shown) fixed on the upper portion of the plating treatment port E through a flange or the like. The auxiliary member 40 is arranged to move up/down depending on the switching operation of the air pressure of the air cylinder. Specifically, the auxiliary member 40 moves up/down between an upper position which is above the beams 6 and a lower position at which the auxiliary member is fitted into the upper part of the cylinder block 1 supported by the support block 32.

On the plates 42 of the auxiliary member 40, multiple fixing plates 43 and sealing members 44 are provided. The multiple fixing plates 43 are arranged to fix the cylinder block 1 by being attached to the upper part of the cylinder block 1. The sealing members 44 are inserted through the upper openings of each cylinder 1*b* (on the crank case side) vertically disposed, which are located in the opposite side of the support block 32.

Figure 9:
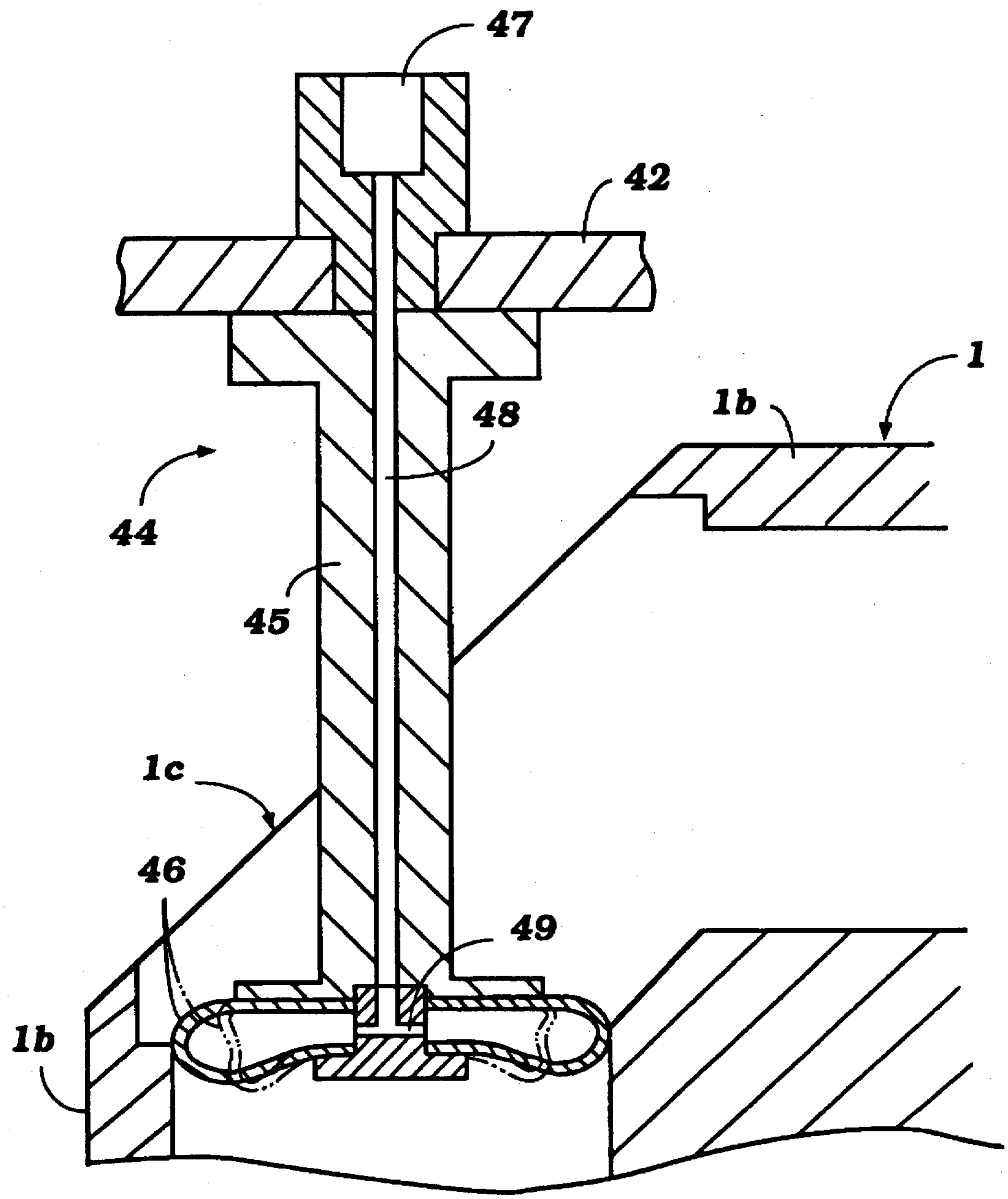
FIG. 9 is an enlarged schematic vertical cross-sectional view perpendicular to a crankshaft (not shown) illustrating one embodiment of a sealing jig positioned inside the cylinder.

As shown in FIGS. 8 and 9, the sealing members 44 are projected downward from the plates 42 relative to each cylinder 1*b*. The sealing members 44 are comprised of multiple (three in FIG. 8) mounting members 45 and flat air tubes 46 provided at the lower end of each mounting member 45. In the plates 42, air ports 47 connected to the air supply source (not shown) for supplying air to the air tubes 46 are provided. In the mounting members 45, air passages 48 connecting to the air ports 47 pass through the center of the mounting members 45. The lower ends of the air passages 48 are connected to the air tubes 46 through the through-holes 49. The size and shape of the air tubes 46 are selected in such a way that the outer periphery of the tubes touches and presses the inner periphery of the cylinder 1*b* when air is supplied thereto and the tubes are expanded.

The fixing plates 43 are projected downward from the plates 42 so as to position between the sealing members 44 and at the outside of the aligned cylinders 1*b*. As shown in FIG. 7, when the auxiliary member 40 is in the lower position, the fixing plates 43 attach to the edge of the crank case 1*c* of the cylinder block 1.

Other Workstations

The detailed structure of the plating treatment port E has been discussed. According to the present invention, other prior treatment ports A–D having similar structures to the treatment port E, are described in FIGS. 10 and 11.

Figure 10:
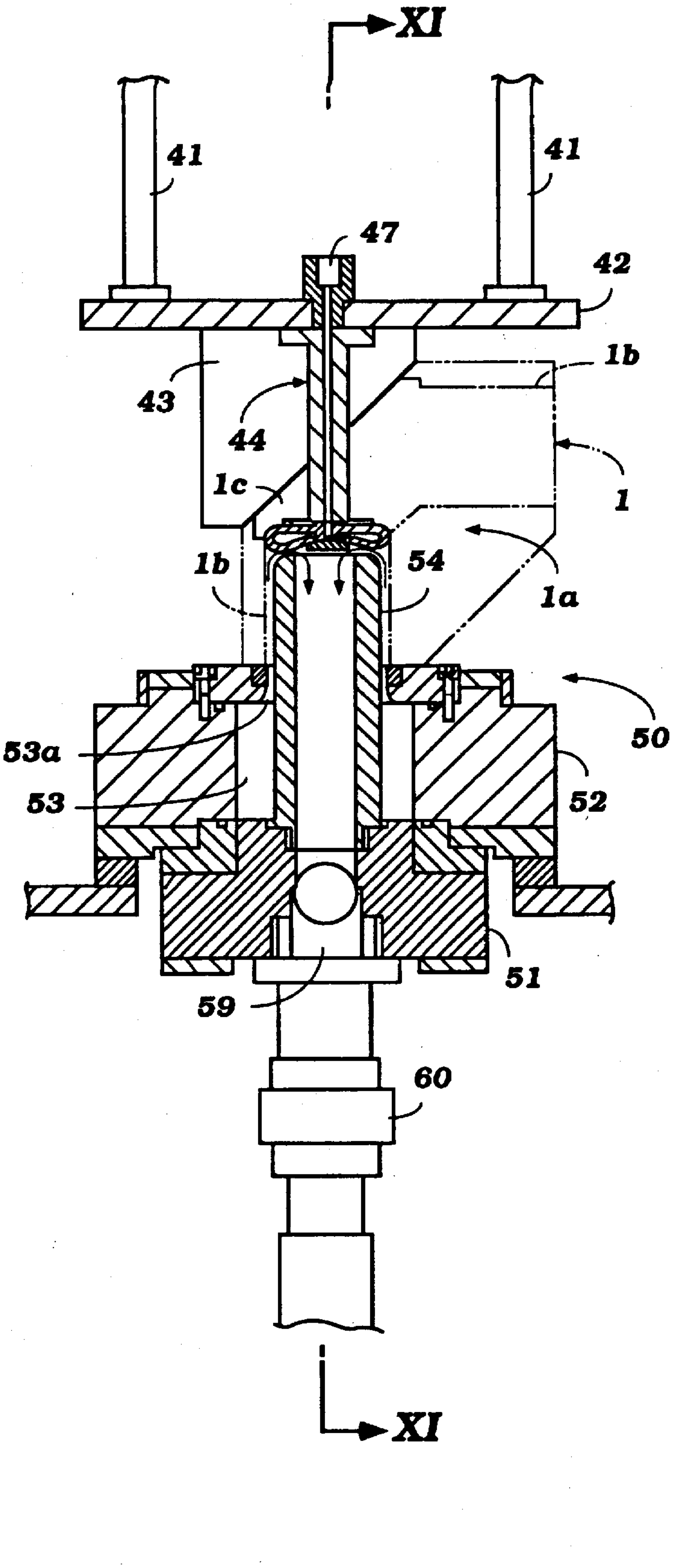
FIG. 10 is an enlarged schematic vertical cross-sectional view perpendicular to a crankshaft (not shown) illustrating one embodiment of a workstation for preliminary treatment, in which a sealing mechanism has descended to fit into a cylinder (two-dash line). A work-gripping mechanism is not shown.
Figure 11:
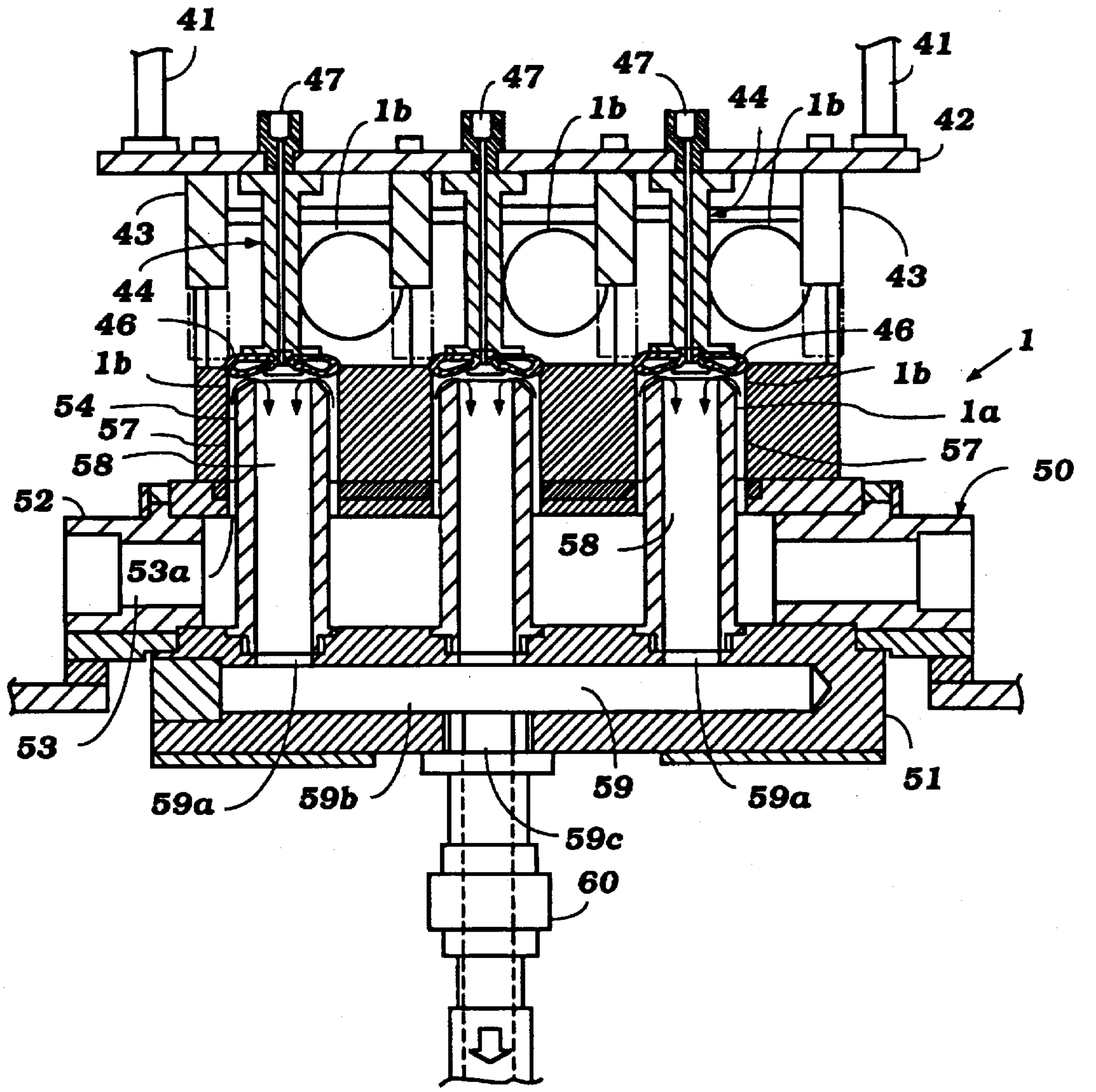
FIG. 11 is a schematic vertical cross-sectional view parallel to a crankshaft (not shown) illustrating the workstation cut in the direction marked XI in FIG. 10.

In FIGS. 10 and 11, a support block 52 mounted on a base 51 of a workstation 50 is arranged in the same way as the support block 32 of the treatment port E. The support block 52 contains a treatment solution guide-in passage 53 which is connected to the treatment solution supply pipe (not shown). Further, cylindrical passage members 54 are provided in positions corresponding to each cylinder 1*b* of the cylinder block 1. The lower ends of the passage members 54 are fixed on the base 51.

The size and shape of the passage members 54 are the same as that of the electrodes 34 of the plating treatment port E. The passage members 54 are projected upward from openings 53*a* through the plating solution guide-in passage 53. Further, the passage members 54 are respectively inserted into the cylinders 1*b* while the cylinder block 1 is supported by the support block 52 so that the passages 57 and 58 are formed inside/outside the passage members 54 of each cylinder 1*b*.

On the base 51, a plating solution guide-out passage 59 is provided. The guide-out passage 59 is comprised of ports 59*a* connecting to the inner passages 58 of each passage member 54, connecting passage 59*b* connecting to every port 59*a* and exit passage 59*c* connecting to the passage 59*b* and extending father downward. A plating solution collection pipe 60 is connected to the guide-out passage 59.

In the above-described treatment system, the structure of the treatment ports A–E in each treatment line La and Lb are basically identical each other. However, the fixing plates 43 of the auxiliary members 40 in the treatment line La faces left with respect to the moving direction of the cylinder block 1. Conversely, the fixing plates 43 of the auxiliary members 40 of the cylinder block 1 in the treatment line Lb faces right with respect to the moving direction of the cylinder block 1.

Plating Operations

The plating treatment of the above-structured plating treatment system is discussed as follows:

First, the cylinder block 1 is placed on the work-positioning port 2 of the treatment line La by a transfer means such as a belt conveyer. At the time of placement, the cylinder block 1 is aligned with the advancing direction of the treatment line La. Further, when the cylinder block 1 is placed on the workpositioning port 2, the openings of one row of the "V" shape of the cylinders 1 are vertically disposed, and the openings at the side of the head of the cylinders 1*b* located in the other row face the outside (towards the bottom side of FIG. 3) of the treatment line La.

When the cylinder block 1 is placed on the work-positioning port 2, the work transfer device 7 is positioned on the work-positioning port 2, and the frame 9 is moved down according to the operation of the air cylinder 14. The work chucks 11A and 11B of the chuck mechanisms 10A and 10B are held in a position apart from each other.

When the frame 9 moves down to the predetermined position where the frame 9 is able to grip the cylinder block 1 therein, the chuck mechanisms 10A and 10 B are then operated. Due to the operation of the chuck mechanisms 10A and 10B, the cylinder block 1 is clamped by the work chucks 11A and 11B from both sides. Then, the cylinder block 1 is moved up together with the frame 9 due to the air-pressure switching operation of the air cylinder 14. Thus, as indicated by the two-dash line in FIGS. 4 and 5, the cylinder block 1 is supported by the work transfer device 7.

In accordance with the above arrangement, the cylinder block 1 is set on each of the treatment ports A–E, washing port Ga–Ge and dryer port F located on the treatment line La so as to apply the desired treatment to one row of the cylinders 1*b* of the cylinder block 1.

For example, with respect to the treatment applied in treatment port E, the cylinder block 1 is set on the support block 32 as shown in FIG. 7. The work transfer device 7 used to transfer the cylinder block 1 thereto is moved back to a predetermined waiting position. Then, the auxiliary member 40 is moved down from its upper position. At this moment, the air supply to the air tube 46 of each sealing member 44 is stopped. When the auxiliary member 40 is completely moved down, the fixing plate 43 contacts the edge of the crank case part 1*c* and the cylinder block 1 is fixed thereby. Each sealing member 44 is then inserted into each upper opening of the corresponding cylinder 1*b*. Next, air is supplied to the air tube 46. As a result, the air tube 46 is expanded outwardly so that the outer periphery of the tube is attached the inner peripheral surface of the cylinder 1*b*, causing the upper openings of the cylinders 1*b* of the cylinder block 1 to be sealed.

When setup of the cylinder block 1 is completed, the plating solution is supplied to and circulated in the pipes as shown in FIG. 6. Electricity is then applied to the electrodes 34 so as to enable high-speed application of plating to the inner peripheral surfaces of the cylinders 1*b* of the cylinder block 1. Namely, the plating solution sent to the guide-in passage 33 in the support block 32 from the supply pipe 21 passes through the outer passages 37, as shown in arrows in FIG. 8, located between the outer peripheral surface of the electrodes 34 and inner peripheral surfaces of the cylinders, and flows from the upper part of the cylinder into the collection pipe 22 through the inner passages 38 inside the electrodes 34 and guide-out passage 39. Accordingly, high-speed plating is performed while the plating solution moves along the inner peripheral surfaces of the cylinders and electricity is applied thereto.

Since the upper openings of the cylinders 1*b* are sealed by the sealing members 44 provided in the auxiliary member 40, plating solution is prevented from flowing out of the cylinders 1*b* from flowing out of the cylinders 1 b to the outside. Thus, the high-speed plating treatment is smoothly performed.

On completion of the plating and washing treatments at each treatment port A–E on the treatment line La for the one side of the row of the cylinders 1*b* of the cylinder block 1, the cylinder block 1 is transferred by the work transfer device 7 to the terminal end of the treatment line La. The cylinder block 1 is then transferred to the treatment line Lb together with the work transfer device 7 by means of the transfer mechanism 8.

After the cylinder block 1 is transferred to the treatment line Lb, the air cylinder 13 is operated in the work transfer device 13. As a result, the cylinder block 1 is rotated according to the rotation of the chuck mechanisms 10A and 10B as shown in FIG. 5. Namely, the cylinder block 1 is rotated 90° and the openings of the other row of the cylinders 1*b* are vertically disposed, while the cylinder openings 1*b* at the side of the cylinder head, located in the row which has already been treated in the treatment line La, face the outside of the treatment line Lb (upper side in FIG. 3).

In the treatment line Lb, the cylinder block 1 is first transferred to the degreasing port A by the work transfer device 7. After the cylinder block 1 is separated from the work transfer device 7 and placed on the support block 32 of the degreasing port A, the degreasing treatment is performed. After the degreasing treatment, the cylinder block 1 is held in the work transfer device 7 again and transferred to the washing port Ga. In repetition of this operation, the treatment applied in each treatment port, washing and transfer operations are thus performed for the other row of cylinders 1*b* of the cylinder block 1, as per in the treatment line La.

When treatments and washing of the other row of cylinders 1*b* of the cylinder block 1 in each treatment port A–E are completed, the cylinder block 1 is placed on the work transferring port 3 and transferred to the next processing point by a belt conveyer or the like. The work transfer device 7, after transferring the cylinder block, is moved back to the treatment line La from the treatment line Lb by a transfer mechanism (not shown).

As described in the foregoing, according to the embodiment of the plating treatment system of the present invention, in the treatment line La, after prior treatments and plating treatment are applied to one row of the cylinders 1*b* of the cylinder block 1, the cylinder block 1 is transferred to the treatment line Lb. The prior treatments and plating treatment are then applied to the other row of cylinders 1*b* of the cylinder block 1. Thus, surface treatment is efficiently performed even on the cylinders 1*b* disposed at certain angle.

Particularly, in the above-embodied treatment system, the work transfer device 7 is transferable from the treatment line La to Lb. Further, the work transfer device 7 contains a mechanism for rotating the cylinder block 1. Thus, setup of the cylinder block 1 on the treatment ports A–E and transfer/placement operations of the cylinder block 1 from the treatment line La to Lb can be smoothly and continuously performed.

The invention may be embodied in other specific forms without departing from its spirit or essential characteristics. In the above-described embodiment, the auxiliary members 40 provided on the treatment lines La and Lb are arranged to move up/down so that the upper openings of the cylinders 1*b* of the cylinder block are sealed by the sealing members 44. The above-described embodiment is to be considered in all respects only as illustrative and not restrictive. For example, a jig having the sealing member 44 can be mounted on the cylinder block 1 beforehand, whereby the cylinder block 1 is transferred while sealing the openings of the cylinders 1*b* at the side of the crank case. This modified embodiment reduces time required to seal the openings of the cylinders 1*b* at the treatment ports A–E, allowing a simplified treatment system.

EXAMPLE 2

Umbrella-shaped Sealing Jig

Sealing Jig Structure

Figure 12:
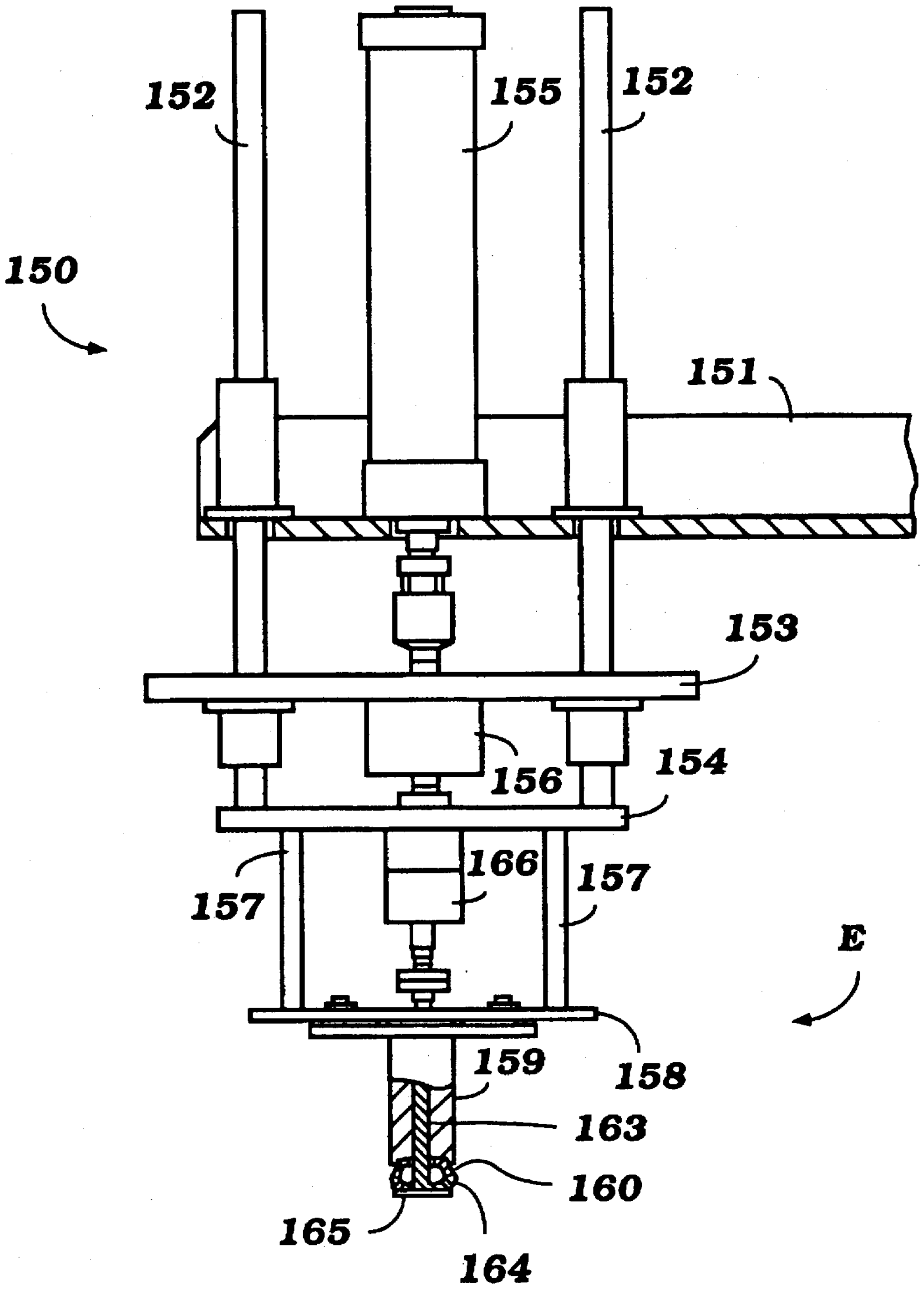
FIG. 12 is a schematic side view (partially cross-sectional) illustrating another embodiment of a sealing mechanism.
Figure 13:
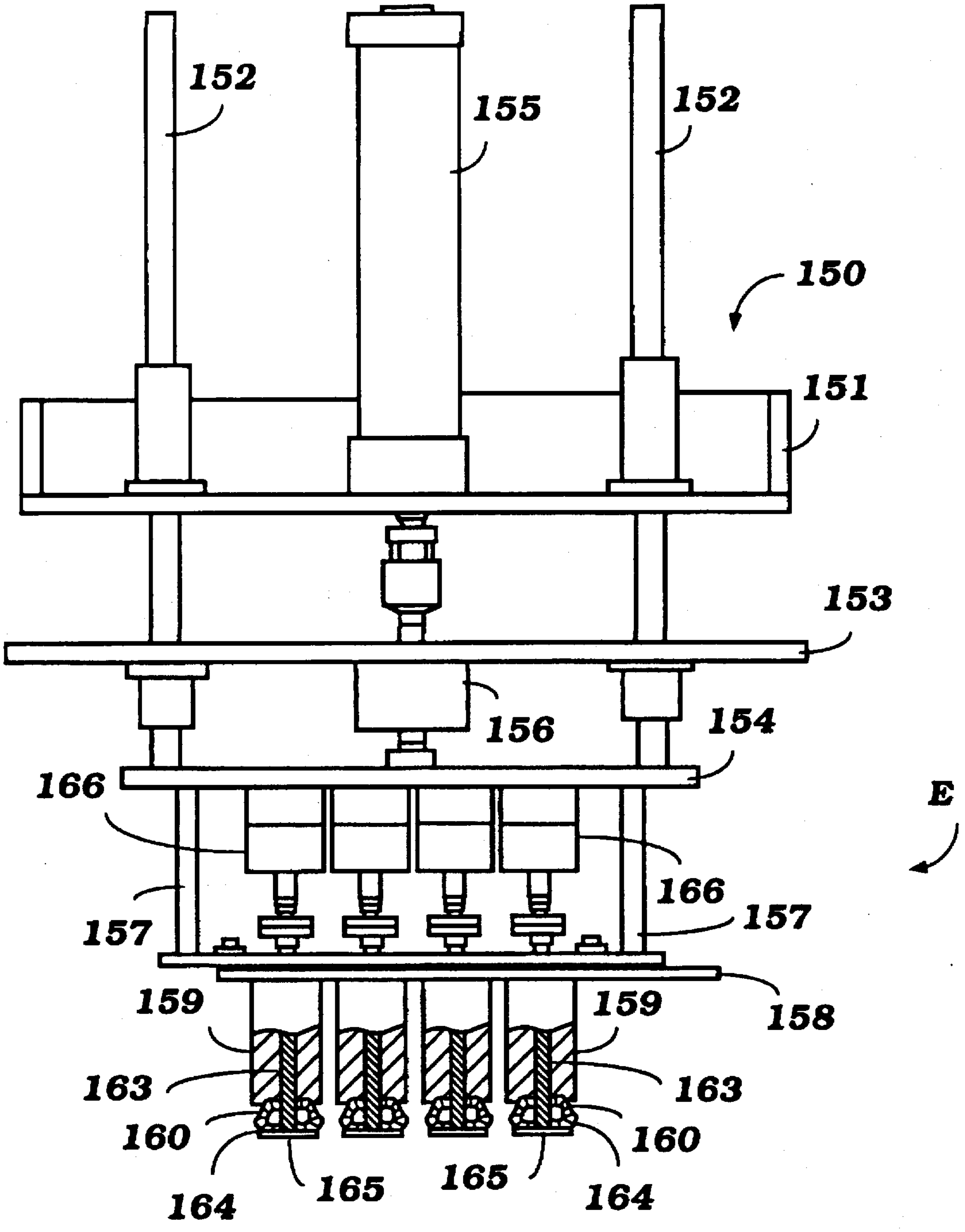
FIG. 13 is a schematic front view (partially cross-sectional) of the sealing mechanism illustrated in FIG. 12.

In FIGS. 12–15, another type of sealing jig is depicted. That is, FIG. 12 is a schematic side view (partially cross-sectional) illustrating another embodiment of a sealing mechanism. FIG. 13 is a schematic front view (partially cross-sectional) of the sealing mechanism illustrated in FIG. 12.

In these Figures, a sealing mechanism 150 is disposed above a workstation for plating. The sealing mechanism 150 has a movable arm 151 which is connected to a driving apparatus (not shown). By the movable arm 151, the sealing mechanism 150 can be moved between a position above the workstation and a position outside the treatment line. When the sealing mechanism 150 is moved outside the treatment line, a cylinder block can be removed from or secured in the workstation. The movable arm 151 is provided with guide rods 152 which vertically slide, and under the movable arm 151, a first movable plate 153 is affixed to the side of the guide rods 152. To the lower ends of the movable arm 151, a second movable plate 154 is affixed. Air cylinders 155 and 156 (for moving up and down) are installed on the movable arm 151 and the first movable plate 153, respectively, in connection with the guide rods 152, whereby the first movable plate 153 and the second movable plate 154 are moved up and down by the are cylinders 155 and 156, respectively. Thus, the seal mechanism 150 itself moves up and down in two steps, controlled by operations of the air cylinders 155 and 156. A supporting plate 158 is affixed to the second movable plate 154 via rods 157. Under the supporting plate 158, sealing jigs are disposed.

Figure 14:
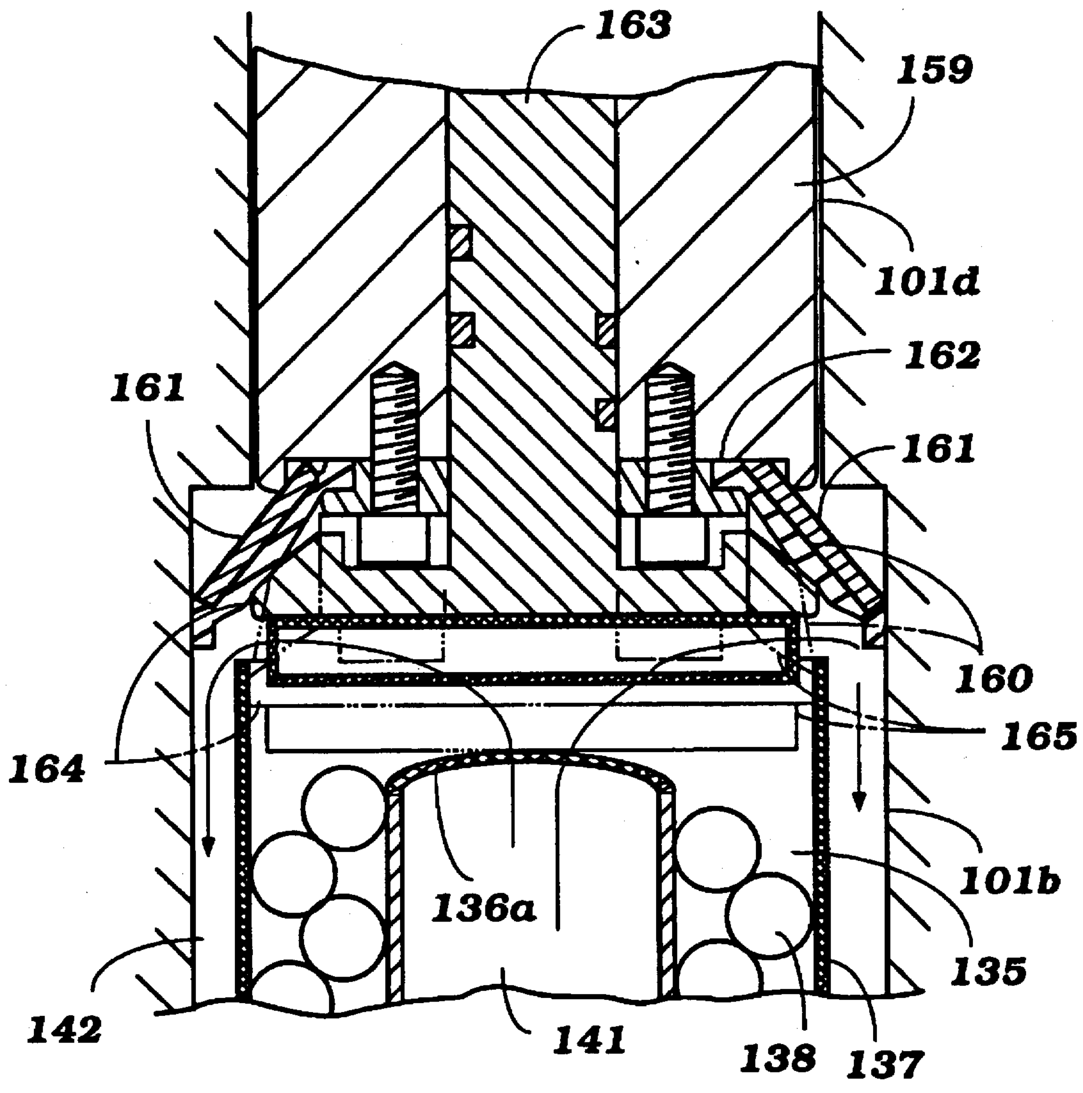
FIG. 14 is an enlarged schematic vertical cross-sectional view illustrating one embodiment of a sealing jig positioned inside the cylinder.

In detail, a cylindrical rod-accommodating member 159 is affixed to the back side of the supporting plate 158, and a sealing member 160 made of elastic material such as rubber is disposed at the lower end of the rod-accommodating member 159. FIG. 14 is an enlarged schematic vertical cross-sectional view illustrating one embodiment of a sealing jig positioned inside the cylinder. As depicted in the Figure, the sealing member 160 is conical, which has a trapezoidal cross-section. Metal pieces 161 are circumferentially placed at intervals around the outer surface of the sealing member 160. The end of the sealing member 160 is affixed to the end of the rod-accommodating member 159, using a fixing member 162, so that the other end of the sealing member 161 is the free end.

In addition, air cylinders 166 are installed on the back side of the second movable plate 154, in order to vertically move movable rods 163 through the supporting plate 158 and the rod-accommodating members 159, whereby the ends of the movable rods 163 stick out of the rod-accommodating members 159. At the ends of the movable rods 163, pressing plates 164 are integrated with the rod-accommodating members 163. The air cylinders 166 can vertically move in two steps, thereby allowing the pressing plates 164 to vertically position at three points, i.e., an upper end point, an intermediate point, and a lower end point. In FIG. 14, when the pressing plate 164 is positioned at the upper end point (indicated by the solid line), the sealing member 160 is open (i.e., umbrella-shaped) by being pressed upward by the pressing plate 164. When the pressing plate 164 is positioned at the lower end point (indicated by the two-dash line), the sealing member 160 is in a closed state due to the weight of the metal pieces 161. When the pressing plate 164 is positioned at the intermediate point, the sealing member 160 is half open.

In addition, an cover 165 to an outer mesh cylinder 137 is placed on the sealing member 164. Nickel pellets 138 are accommodated in a space 135 formed between the outer mesh cylinder 137 and an inner cylinder, thereby forming an electrode. The cover 165 has a diameter slightly smaller than that of the outer mesh cylinder 137, thereby allowing for positioning the cover right above a inside cover 136*a* during plating treatment. Incidentally, a controller to control the movements of the aforesaid air cylinders, which is omitted in the Figure, should be installed.

Sealing Functions

Figure 15:
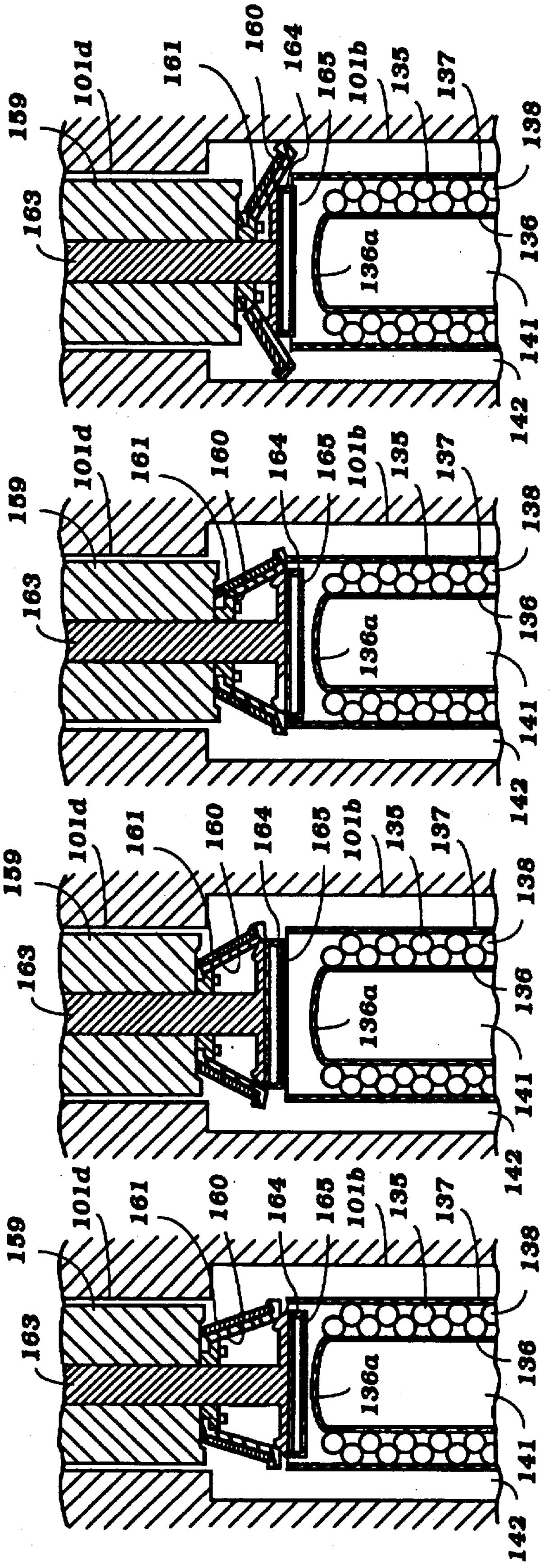
FIG. 15 is an enlarged schematic vertical cross-sectional view illustrating a fitting mechanism taking place in the order, a, b, c, and d.

FIG. 15 is an enlarged schematic vertical cross-sectional view illustrating a fitting mechanism taking place in the order, a, b, c, and d.

After fitting a cylinder block into a workstation, the sealing mechanism 150 is moved to a point above the workstation. The first movable plate 153 then descends until the end point, thereby inserting the sealing jig composed of the rod-accommodating member 159, the sealing member 160, the pressing plate 164 and the like, into the inside of the cylinder. Although a projecting step such as a separation wall 101*d* is formed, the pressing plate 164 can be readily inserted inside the cylinder because the sealing member 160 is closed (FIG. 15(*a*)). In FIG. 15(*a*), the cover 165 attached to the sealing member 164 is disposed slightly inside the outer mesh cylinder 137, and above the inner cover 136. When the first movement of the air cylinder 166 is initiated, the pressing plate 164 is moved up to a certain point from the lower end point, whereby the sealing member 160 extends due to the upward pressure by the pressing plate 164 as depicted in FIG. 15(*b*). In this figure, the sealing member 160 extends as wide as possible without touching the inside surface of the cylinder. When the second step movement of the air cylinder 156 is initiated, the movable plate 154 descends to the lower end point. The length of the movement is equivalent to that of the sealing member 164 in FIG. 15 (b), meaning that the cover 165 is again positioned above the inner cover 136*a*. When the air cylinder 166 is operated again, the sealing member 160 is fully open, thereby pressing the inside surface and sealing the passage 101*b* with the sealing member 160, as depicted in FIG. 15(*d*). Further, by moving downward the rod-accommodating member 159, the cover 135 is pushed in the inside of the electrode, i.e., inside the outer mesh cylinder 137, thereby closing the upper opening of the pellet-accommodating space 135. Thus, it is possible to prevent the pellets from flowing out of the outer mesh cylinder. In this embodiment, since not only the rod 163 (i.e., the pressing member 164), but also the rod-accommodating member 159, moves downward to seal the passage for the liquid, the sealing member 164 can be positioned near the end of the electrode, thereby diminishing the dead area which is between the lower dead point position of a piston and the very edge of the cylinder. The dead area is necessary for secure sealing, but need not be plated, and consequently enlarges the size of the cylinder. According to the present invention, these drawbacks can be efficiently eliminated.

The plating coating deposited on the inside cylinder surface of the cylinder unit used in the present invention has desirably been formed in connection with an improved plating system, the details of which are set forth in a U.S. patent application entitled "Plating Liquid, Plating Method and Plating Cylinder," Ser. No. 08/299,838, filed on Sep. 1, 1994 (claiming priority from Japanese Patent Application No. 218753, filed Sep. 2, 1993), which is hereby incorporated herein by reference. Further, the plating coating deposited on the inside cylinder surface of the cylinder block of the present invention may also be a non-homogenous composite plating coating formed by an improved plating system, the details of which are set forth in U.S. patent applications entitled "Non-homogenous Composite Plating Coating," Ser. No. 08/391,504, filed Feb. 21, 1995, and "Plating Method and Plating System for Non-homogenous Composite Plating Coating," Ser. No. 08/391,505, filed Feb. 21, 1995 (both claiming priority from Japanese Patent Application No. 22640, filed Feb. 21, 1994), which are hereby incorporated herein by reference. Further, the plating coating deposited on the inside cylinder surface of the cylinder unit used in the present invention may also be a plating coating formed in a limited area by an improved plating system, the details of which are set forth in U.S. patent applications entitled "Sleeveless Cylinder Block Without Marginal Plating Coating," Ser. No. 08/406,691, filed Mar. 20, 1995 (claiming priority from Japanese Patent Application No. 74317, filed Mar. 18, 1994), which is hereby incorporated herein by reference.

We claim:

1. A method for treating with treating liquid the inside surfaces of cylinders of a work having at least one first cylinder and at least one second cylinder, said first and said second cylinders having at least two different axial alignments, comprising the steps of:

(a) aligning said at least one first cylinder with a longitudinal passage-forming member for supplying treating liquid to the inside of said at least one first cylinder, provided in a workstation;

(b) placing said at least one first cylinder on a work-supporting base provided in said workstation to sheathe the length of said longitudinal passage-forming member with said at least one first cylinder;

(c) supplying treating liquid to the inside of said at least one first cylinder via the passage formed inside said cylinder by said longitudinal passage-forming member, thereby treating said inside surface of said at least one first cylinder with said treating liquid;

(e) rotating said work in such a way that said at least one second cylinder is aligned with a longitudinal passage-forming member provided in a workstation; and (f) repeating the same operations on said at least one second cylinder at said workstation.

2. The method for treating with treating liquid the inside surfaces of cylinders of a work according to claim 1, wherein said work is a cylinder block of a V-shaped engine.

3. The method for treating with treating liquid the inside surfaces of cylinders of a work according to claim 1, further comprising, between steps (d) and (e), transferring said work to workstations in sequence, and conducting the same operations at each workstation.

4. The method for treating with treating liquid the inside surfaces of cylinders of a work according to claim 3, wherein the workstations for treating said at least one first cylinder and the workstations for treating said at least one second cylinder are aligned in parallel.

5. The method for treating with treating liquid the inside surfaces of cylinders of a work according to claim 1, wherein each longitudinal passage-forming members is placed in such a way that the axial direction thereof is vertical.

6. The method for treating with treating liquid the inside surfaces of cylinders of a work according to claim 1, wherein said treatment in the workstation is plating treatment on the inside of each cylinder, and said longitudinal passage-forming member installed in said workstation is an electrode.

7. The method for treating with treating liquid the inside surfaces of cylinders of a work according to claim 1, further comprising, between steps (b) and (c), sealing with a sealing jig the end of said cylinder opposite to the entrance of said longitudinal passage-forming member.

8. The method for treating with treating liquid the inside surfaces of cylinders of a work according to claim 7, wherein said sealing jig comprises:

a rod having a pressing plate at the end facing said longitudinal passage-forming member;

a rod-accommodating member inside which said rod moves in the axial direction; and a sealing member for sealing the end of said cylinder, which is provided at the end of said rod-accommodating member in such a way that said sealing member seals the end of said cylinder by extending in the outward direction, when said rod moves relative to said rod-accommodating member to press said sealing member with said pressing plate in the axial direction.

9. The method for treating with treating liquid the inside surfaces of cylinders of a work according to claim 8, wherein said sealing member extends in the outward direction while said rod-accommodating member moves towards said longitudinal passage-forming member.

10. The method for treating with treating liquid the inside surfaces of cylinders of a work according to claim 9, wherein each the extension of said sealing member and move of said longitudinal passage-forming member takes place alternately at least once.

11. The method for treating with treating liquid the inside surfaces of cylinders of a work according to claim 9, wherein said longitudinal passage-forming member, which functions as an electrode, comprises:

an inner cylinder, the inside of which forms a passage for the treating liquid;

an outer cylinder made of a mesh material; and metal pellets to be electrolyzed accommodated between said inner and outer cylinders; and said pressing plate is provided with a cover for said outer cylinder, made of a mesh material, on the surface facing said longitudinal passage-forming member so as to prevent said metal pellets from flowing out of said outer cylinder.

* * * * *